United States Patent [19]

Ogawa et al.

[11] 4,449,149

[45] May 15, 1984

[54] FACSIMILE APPARATUS

[75] Inventors: Mutsuo Ogawa; Noboru Murayama, both of Tokyo, Japan

[73] Assignee: Ricoh Company, Ltd., Tokyo, Japan

[21] Appl. No.: 394,740

[22] Filed: Jul. 2, 1982

[30] Foreign Application Priority Data

Jul. 9, 1981 [JP] Japan .................................. 56-106241

[51] Int. Cl.³ .............................................. H04N 1/40
[52] U.S. Cl. ...................................... 358/280; 358/284
[58] Field of Search ................ 358/280, 284, 259, 138

[56] References Cited

U.S. PATENT DOCUMENTS 3,309,461  3/1967  Deutsch .............................. 358/138

Primary Examiner—Howard W. Britton
Attorney, Agent, or Firm—David G. Alexander

[57] ABSTRACT

A facsimile apparatus is disclosed wherein in a transmission mode facsimile data are transmitted scan line by scan line but in a predetermined irregular distribution of scan lines which has no relation with the order of scan lines on a document while, in a reception mode, the received facsimile data are reproduced rearranged to the original order of scan lines on a document.

8 Claims, 7 Drawing Figures

Fig. 3

| A | B | C |
|---|---|---|
| S$_0$ | 1 | D$_0$ |
| S$_1$ |   | D$_9$ |
| S$_2$ | 3 | D$_2$ |
| S$_3$ |   | D$_{11}$ |
| S$_4$ | 5 | D$_4$ |
| S$_5$ |   | D$_{13}$ |
| S$_6$ | 7 | D$_6$ |
| S$_7$ |   | D$_{15}$ |
| S$_8$ | 9 | D$_8$ |
| S$_9$ | 2 | D$_{17}$ |
| S$_{10}$ | 11 | D$_{10}$ |
| S$_{11}$ | 4 | D$_{19}$ |
| S$_{12}$ | 13 | D$_{12}$ |
| S$_{13}$ | 6 | D$_{21}$ |
| S$_{14}$ | 15 | D$_{14}$ |
| S$_{15}$ | 8 | D$_{23}$ |
| S$_{16}$ | 17 | D$_{16}$ |
| S$_{17}$ | 10 | D$_{25}$ |
| S$_{18}$ | 19 | D$_{18}$ |
| S$_{19}$ | 12 | D$_{27}$ |
| S$_{20}$ | 21 | D$_{20}$ |
| S$_{21}$ | 14 | D$_{29}$ |
| S$_{22}$ | 23 | D$_{22}$ |
| ⋮ | ⋮ | ⋮ |

Fig. 4

| A | B | C |
|---|---|---|
| P$_0$ | 1 | P$_0$ |
| P$_9$ | 6 | — |
| P$_2$ | 2 | P$_2$ |
| P$_{11}$ | 8 | — |
| P$_4$ | 3 | P$_4$ |
| P$_{13}$ | 10 | — |
| P$_6$ | 4 | P$_6$ |
| P$_{15}$ | 12 | — |
| P$_8$ | 5 | P$_8$ |
| P$_{17}$ | 14 | P$_9$ |
| P$_{10}$ | 7 | P$_{10}$ |
| P$_{19}$ | 16 | P$_{11}$ |
| P$_{12}$ | 9 | P$_{12}$ |
| P$_{21}$ | 18 | P$_{13}$ |
| P$_{14}$ | 11 | P$_{14}$ |
| P$_{23}$ | 20 | P$_{15}$ |
| P$_{16}$ | 13 | P$_{16}$ |
| P$_{25}$ | 22 | P$_{17}$ |
| P$_{18}$ | 15 | P$_{18}$ |
| P$_{27}$ | 24 | P$_{19}$ |
| P$_{20}$ | 17 | P$_{20}$ |
| P$_{29}$ | 26 | P$_{21}$ |
| P$_{22}$ | 19 | P$_{22}$ |
| ⋮ | ⋮ | ⋮ |

FACSIMILE APPARATUS

BACKGROUND OF THE INVENTION

The present invention generally relates to a facsimile apparatus which in a transmission mode codes image data scan line by scan line and transmits them as facsimile data while, in a reception mode, it decodes such coded facsimile data and reproduces them on a paper sheet. More particularly, the present invention relates to a facsimile apparatus which can reproduce sufficiently legible facsimile data despite successive line errors which may occur at a remote transmitter during transmission.

In a prior art facsimile system, a transmitter produces image data by scanning an original document and codes them scan line by scan line into facsimile data. The facsimile data are transmitted with end-of-line or EOL codes interposed between each adjacent facsimile data. A receiver, on the other hand, decodes the received facsimile data and reproduces them on a copy sheet in the order of reception. Such an apparatus involves a problem, however. If errors occur in a plurality of successive lines of facsimile data during transmission due to noise in the transmission line or the like, the corresponding number of scan lines for data reproduction become omitted altogether. Supposing that a character on one character line is covered by eight scan lines inclusive of interline spacings, more than one half of the character is omitted to make the resulting copy illegible.

To overcome the problem discussed above, there has been proposed a system which repeatedly transmits facsimile data on the same line. This is not fully acceptable in view of the resulting increase in the time period necessary for transmission.

SUMMARY OF THE INVENTION

In accordance with the present invention, a facsimile apparatus is operated such that in a transmission mode facsimile data are transmitted scan line by scan line but in a predetermined irregular distribution of scan lines which has no relation with the order of scan lines on a document while, in a reception mode, the received facsimile data are reproduced rearranged to the original order of scan lines on a document.

It is an object of the present invention to provide a facsimile apparatus which can produce a sufficiently identifiable copy without resorting any additional time period for transmission, when errors have occurred in facsimile data on a plurality of successive scan lines during data transmission.

It is another object of the present invention to provide a generally improved facsimile apparatus.

Other objects, together with the foregoing, are attained in the embodiments described in the following description and illustrated in the accompanying drawings.

BRIEF DESCRIPTION OF THE DRAWINGS

FIG. 3 is a table of a data processing order for describing a transmission operation mode of the facsimile apparatus of FIG. 2;

FIG. 4 is a table of a data processing order for describing a reception operation mode of the facsimile apparatus of FIG. 2.

DESCRIPTION OF THE PREFERRED EMBODIMENTS

While the facsimile apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1A:
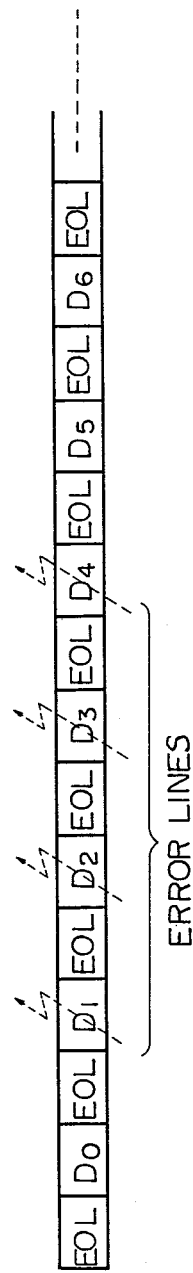
FIGS. 1a and 1b are schematic diagrams showing the order of data transmission and that of data reproduction in a prior art facsimile apparatus, respectively.
Figure 1B:
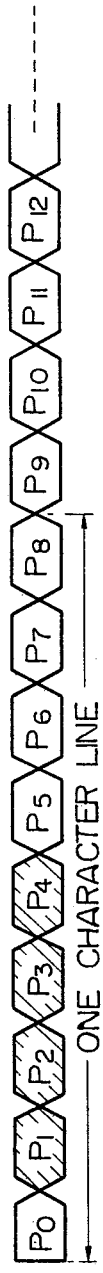

Referring to FIGS. 1a and 1b of the drawings, the order of data transmission and that of data reproduction in a prior art facsimile apparatus are shown. At a transmitter, image data provided by scanning an original document are coded scan line by scan line into facsimile data $D_1$–$D_n$. As shown in FIG. 1a, the facsimile data $D_1$–$D_n$ are transmitted with end-of-line or EOL codes interposed between each adjacent facsimile data. At a receiver, on the other hand, the received facsimile data $D_1$–$D_n$ are decoded and reproduced on a copy sheet in the order of reception. Such an apparatus involves the previously discussed problem. If errors occur in a plurality of scan lines of facsimile data such as $D_1$–$D_4$ during transmission due to noise in the transmission line or the like, the corresponding number of scan lines for data reproduction $P_1$–$P_4$ become omitted altogether as shown in FIG. 1b. Supposing that a character on one character line consists of eight scan lines inclusive of interline spacings, more than one half of the character becomes omitted to make the resulting copy illegible.

Figure 2:
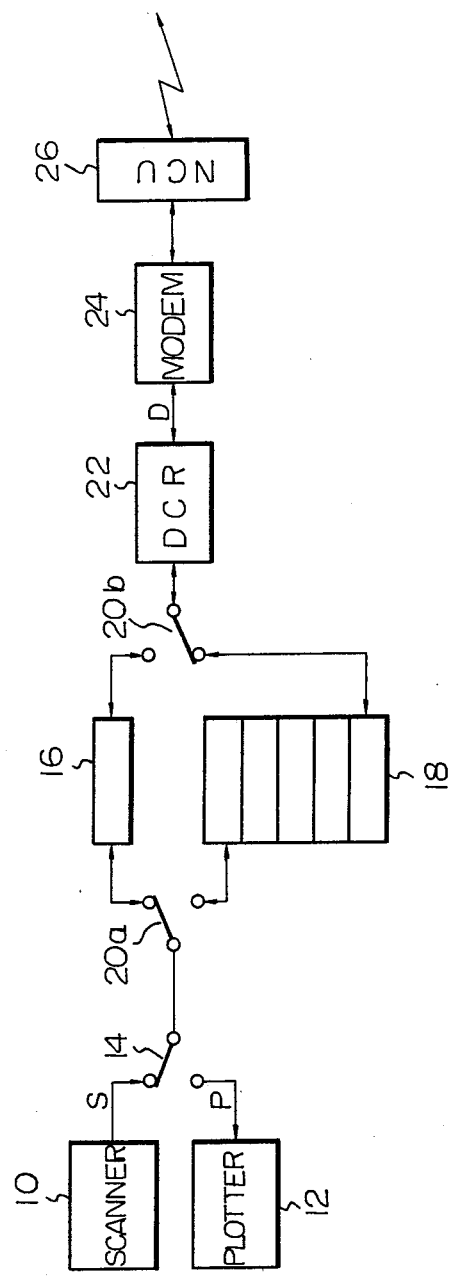
FIG. 2 is a block diagram of a facsimile apparatus embodying the present invention.

Referring to FIG. 2, a facsimile apparatus embodying the present invention includes a scanner 10 and a plotter 12 one of which is selected by a switch 14 depending upon the operation mode of the apparatus. The reference numeral 16 designates a buffer memory for storing one scan line of image data, and 18 a buffer memory capable of storing five scan lines of image data. A data switch 20a selects either one of the buffer memories 16 and 18 for each scan line, as will be described. As second data switch 20b also selects either one of the buffer memories 16 and 18 for each scan line at the opposite line to the data switch 20a. A data compression and reproduction unit 22 is connected at one end with the data switch 20b and at the other end with a modem 24, which is in turn connected with a network control unit 26.

In a transmission mode, the switch 14 is connected to the scanner 10 as shown in FIG. 2. As the scanner 10 begins to scan an original document and deliver image data S scan line by scan line, the data S are alternately fed on a line by line basis to the buffer memories 16 and 18 via the data switch 20a whose position alternates for each scan line. The buffer memory sequentially stores the input data S and supplies them to the data compression unit 22 via the switch 20b in the order of storage and at a delay corresponding to five scan lines.

Let it be supposed that, in column A of FIG. 3, the scanner 10 has completed the delivery of nine lines of data $S_0$–$S_8$ and prepared for the delivery of the next data $S_9$. At this instant, the buffer memory 18 has already stored five scan lines of data $S_0$, $S_2$, $S_4$, $S_6$ and $S_8$. Suppose that the switches 20a and 20b are both conditioned as shown in FIG. 2. Then, the next image data $S_9$ from the scanner 10 is coupled to the buffer memory 16 via the switch 20a while, at the same time, the data $S_0$ is fed from the buffer memory 18 to the compression unit 22 via the switch 20b. Thus, the image data $S_0$ is coded first.

After the supply of one scan line of data to the buffer memory 16 and that from the buffer memory 18, the switches 20a and 20b are actuated individually to the opposite positions. As a result, the subsequent data $S_{10}$ from the scanner 10 is delivered to the buffer memory 18 via the switch 20a. At the same time, one scan line of previously stored data $S_9$ is fed from the buffer memory 16 to the data compression unit 22 via the switch 20b. Thus, the data $S_9$ is coded second by the data compression unit 22.

As the switches 20a and 20b are actuated to regain their original positions, the data $S_{11}$ is coupled to the buffer memory 16 while the data $S_2$ is fed from the buffer memory 18 to the data compression unit 22. Hence, the data $S_2$ is the third data to be coded.

Thereafter, every time the switches 20a and 20b are reconditioned, the rest of the data is sequentially coded in the order shown in column B of FIG. 3, that is, advancing nine lines and then returning seven lines.

As in the conventional system, the coded data D are fed from the modem 24 to a transmission line through the network control unit 26 in the order indicated in column C of FIG. 3.

In a reception mode, the facsimile apparatus has the switch 14 shown in FIG. 2 positioned oppositely to the illustrated one. The data D coming in through the network control unit 26 are supplied to and decoded by the data reproduction unit 22 via the modem 24. As in the transmission mode, the reproduced data now designated P are fed to the buffer memories 16 and 18 alternately through the switch 20b. Column A in FIG. 4 indicates the order of delivery of the scan lines of decoded data P from the data compression unit 22. The data $P_0$, $P_2$, $P_4$, $P_6$ and $P_8$ are thus fed from the buffer memory 16 each delayed by one line and coupled to the plotter 12 via the switch 20a and the switch 14, which has then changed its position. In the meantime, the buffer memory 18 delivers empty data. At the same time, the buffer memory 18 is supplied with five lines of data $P_9$, $P_{11}$, $P_{13}$, $P_{15}$ and $P_{17}$ coming out from the data reproduction unit 22.

When the next data $P_{10}$ produced from the data compression unit 22 enters the buffer memory 16 through the switch 20b whose position is changed this time, the data $P_9$ is fed from the buffer memory 18 to the plotter 12 via the switch 20a whose position is opposite to the illustrated one and the switch 14.

Thereafter, as in the transmission mode, the data P to be recorded are applied to the plotter 12 in the order indicated in column B of FIG. 4 every time the switches 20b and 20a reverse their positions, that is, advancing nine lines and returning seven lines. As a result, the plotter 12 scans a sheet in the same order as the scanning at the transmitter as shown in column C of FIG. 4, thereby providing a copy of the original document. Though the initial eight lines of data and the final eight lines of data are not identical with those on the original document, it will be seen that such data can be replaced by empty data without any problem because no data of significance is usually carried on the initial eight lines and final eight lines of a document. However, even such replacement of data can be avoided merely by setting the scan start and end positions at the outside of an original document.

In this manner, while the transmitter codes and transmits image data with an irregular yet predetermined distribution of scan lines, the receiver reproduces them after rearranging them into the original scan sequence. This allows legible image data to be reproduced on a sheet at the receiver though continuous line errors may occur during transmission at the transmitter.

Figure 5A:
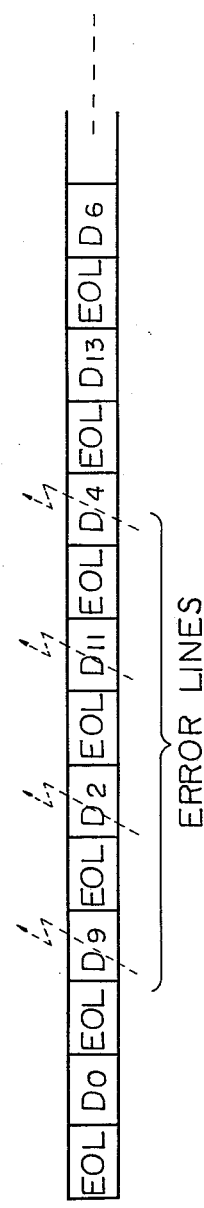
FIGS. 5a and 5b are schematic diagrams indicating transmitted data and reproduced data in connection with successive line errors.
Figure 5B:
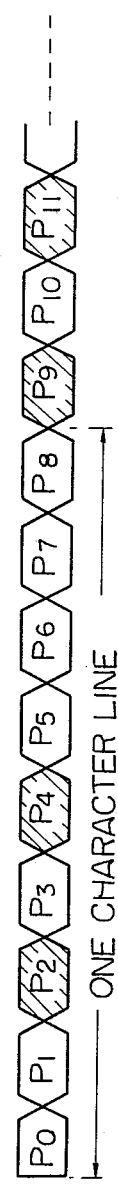

Suppose that errors have occurred in successive facsimile data $D_9$, $D_2$, $D_{11}$ and $D_4$ during transmission as shown in FIG. 5a. The error lines are scattered in the reproduced data as indicated in FIG. 5b. Assuming that a character on one line consists of eight scan lines inclusive of the interline spacings as previously described, only two scan lines are omitted in the reproduced data out of the total eight scan lines and, moreover, the omission occurs at an interval. Accordingly, filling up each omitted line with the preceding or following line will result a copy which has almost no trace of the errors.

In the embodiment described above, a transmitter has scattered the scan lines before coding them and a receiver has rearranged the scan lines after decoding them. However, such timings can be designed as desired such as scattering the scan lines after coding and rearranging them before decoding.

The scan lines have been shown and described as being irregularly distributed by a method which advances nine lines and then returns seven lines, but this is not restrictive but only illustrative. The method may be one which advances "m" lines and returns "n" lines, one which divides the scan lines into a plurality of blocks and scatter them within each block, e.g., a data block $D_1$, $D_8$, $D_7$, $D_3$, $D_6$, $D_4$, $D_5$, a data block $D_9$, $D_{16}$, $10_{10}$, $D_{15}$, $D_{11}$, $D_{14}$, $D_{12}$, $D_{13}$, a data block $D_{17}$, $D_{24}$, ..., or one which scatters the scan lines as $D_1$, $D_{1+k}$, $D_{1+3K}$ ... $D_2$, $D_{2+K}$, $D_{2+2K}$ ... $D_n$, $D_{n+K}$, $D_{n+2K}$. The last mentioned method is applicable if the storage capacity is sufficiently large.

While the embodiment shown and described has employed a hardware construction which includes switches, buffer memories and a data compression and reproduction unit, it may be replaced by a software construction using a microprocessor, ROM and RAM. The software construction may readily be operated if a transmitter causes a header code to precede each scan line of data to indicate the number of the scan line while a receiver selects an address of RAM in response to each header code and successively stores the respective scan lines of received data.

In summary, it will be seen that the present invention provides a facsimile apparatus which can reproduce identifiable data overcoming errors which may occur in successive scan lines when the data are transmitted. The error lines appear intermittently during reproduction to eliminate the need for repeated transmission of the same line of data, thereby shortening a time period necessary for data transmission.

Various modifications will become possible for those skilled in the art after receiving the teachings of the present disclosure without departing from the scope thereof.

What is claimed is:

1. A facsimile apparatus including a transmitter, comprising:
   a scanner for scanning an original document and producing a continuous train of data carried on successive scan lines, the adjacent scan lines of data being distinguished from each other by an intervening end of line code;

scattering means for scattering the successive lines of data into a predetermined irregular order; and buffer means for storing the scattered scan lines of data and producing the stored data one scan line at a time in such a manner that after the "N" line of stored data has been fed out, the "N+M" line of stored data is fed out, where N and M are integers and M is not larger than +2 and not smaller than +2.

2. An apparatus as in claim 1, further comprising encoding means for encoding the data from the buffer means.

3. An apparatus as in claim 2, in which said encoding means comprises a compressor for encoding and compressing the data from the buffer means.

4. An apparatus as in claim 1, further comprising encoding means for encoding the train of data from the scanner and feeding the encoded data to the scattering means.

5. An apparatus as claimed in claim 4, in which said encoding means comprises a compressor for encoding and compressing the train of data from the scanner.

6. An apparatus as in claim 1, in which said buffer means comprises a first input buffer for storing the scattered data one scan line at a time and a second input buffer for storing the scattered data a predetermined numbers of scan lines at a time.

7. An apparatus as in claim 6, in which said scattering means comprises switching means for alternately distributing the train of data from the scanner to the first input buffer and the second input buffer.

8. An apparatus as claimed in claim 1, further including a receiver which comprises a plotter, said scattering means and buffer means being constructed to rearrange data scattered at a remote station and transmitted thereto into a train of data of the original order, said plotter reproducing an original document from the rearranged train of data.

* * * * *